July 7, 1964 L. J. ERCK ETAL 3,140,326

AGGLOMERATING METHOD AND APPARATUS

Original Filed Feb. 15, 1956 6 Sheets-Sheet 1

INVENTORS
LOUIS J. ERCK,
DONALD C. VIOLETTA
& THOMAS E. BAN
BY WATTS & EDGERTON
B. D. Watts
ATTORNEYS

AGGLOMERATING METHOD AND APPARATUS

Original Filed Feb. 15, 1956 6 Sheets-Sheet 2

INVENTORS
LOUIS J. ERCK,
DONALD C. VIOLETTA
& THOMAS E. BAN
BY WATTS & EDGERTON
B D Watts
ATTORNEYS July 7, 1964 L. J. ERCK ETAL 3,140,326

AGGLOMERATING METHOD AND APPARATUS

Original Filed Feb. 15, 1956 6 Sheets-Sheet 3

INVENTORS
LOUIS J. ERCK,
DONALD C. VIOLETTA
& THOMAS E. BAN
BY WATTS & EDGERTON
B. D. Watts
ATTORNEYS INVENTORS
LOUIS J. ERCK,
DONALD C. VIOLETTA
& THOMAS E. BAN
BY WATTS & EDGERTON
B. D. Watts
ATTORNEYS July 7, 1964 L. J. ERCK ETAL 3,140,326

AGGLOMERATING METHOD AND APPARATUS

Original Filed Feb. 15, 1956 6 Sheets-Sheet 5

INVENTORS
LOUIS J. ERCK,
DONALD C. VIOLETTA
& THOMAS E. BAN
BY WATTS & EDGERTON
B. D. Watts
ATTORNEYS

AGGLOMERATING METHOD AND APPARATUS

Original Filed Feb. 15, 1956 6 Sheets-Sheet 6

INVENTORS
LOUIS J. ERCK,
DONALD C. VIOLETTA
& THOMAS E. BAN
BY WATTS & EDGERTON
B. D. Watts
ATTORNEYS

United States Patent Office 3,140,326

Patented July 7, 1964

3,140,326

AGGLOMERATING METHOD AND APPARATUS

Louis J. Erck, Negaunee, and Donald C. Violetta, Ishpeming, Mich., and Thomas E. Ban, Cleveland, Ohio, assignors to The Cleveland-Cliffs Iron Company Original application Feb. 15, 1956, Ser. No. 580,423. Divided and this application Dec. 29, 1958, Ser. No. 796,997
(Filed under Rule 47(a) and 35 U.S.C. 116)
11 Claims. (Cl. 264—117)

The present invention relates generally to the art of agglomerating of finely-divided materials and is more particularly concerned with a novel method of agglomerating iron ore fines to produce relatively hard and dense green balls of substantially uniform size suitable for firing and conversion thereby into blast furnace or open-hearth material, and with unique apparatus implementing that method.

The terms "agglomerate," "agglomerating," "balling," "green balls," "pellets" and "indurated pellets" are used herein in accordance with their normal and usual meanings and usages in the art. Thus, "agglomerate" and its derivatives are generic expressions which mean and includes all types of bodies artificially produced from comminuted particles. "Balling" refers to processes of producing agglomerates by rolling comminuted materials together with a suitable binder. "Green balls" are a specific type of agglomerates produced by balling operation. "Pellets" and "indurated pellets" results from the firing of green balls at temperatures sufficiently high that substantial strength and shock resistance are imparted to the ball products due to chemical and/or physical changes in these products.

One essential step in the recovery of iron from horizontal ores, such as taconites and jaspers, is the conversion of the finely-divided particles of iron ore into form suitable for charging into an open-hearth or blast furnace. According to commercial procedures which have been evolved for this purpose, the iron-rich particles of specular ores are separated from associated siliceous gangues by processes which leave the iron values in dust-like form. It has been proposed to convert these values into cold compacts such as briquettes or extrusions or into indurated products such as pellets, sinter or nodules. A practical means for accomplishing this result involves the pelletizing of these materials by rolling them and firing the resulting agglomerates to produce the physical properties necessary to see these bodies through handling, shipping, charging and smelting operations. The preferred procedure and apparatus for carrying out the firing phase of this production, particularly when the ores are largely non-magnetic, is that described and claimed in copending application Serial No. 587,393, filed by Louis J. Erck, Donald C. Violetta and Thomas E. Ban.

The agglomerating procedure and apparatus with which this invention is particularly concerned has evolved in the art to the point where it has become standard practice to employ an inclined balling drum with appropriate means for delivering fines and compounding solid materials into one end of the drum together with or separately from moisture to aid in the agglomeration. When conditions are proper, ball-like agglomerates are formed as the drum is rotated on its longitudinal axis and are gradually moved toward the lower end of the drum and discharged therefrom and then screened and selected as to size for firing. A number of variations in basic drum design have been developed in efforts to minimize the shortcomings of the best prior equipment, and a number of different devices have been used in efforts to control conditions in the drum and improve the yields of the desired agglomerates. Also, there have been a wide variety of combinations of ingredients developed to produce green balls which will have sufficient strength to withstand the screening and handling operations leading up to firing. To the best of our knowledge, the best practices heretofore known along these lines are disclosed and claimed in the copending application Serial No. 346,786, filed April 3, 1953, by Grover J. Holt and Louis J. Erck, now Patent 2,799,572 and in copending application Serial No. 587,393, filed by Louis J. Erck, Donald C. Violetta and Thomas E. Ban and now Patent 3,024,101.

However, green ball production, despite these major advances, has not heretofore been generally considered to be beyond substantial advance and improvement, particularly in respect to yields and rates. Other deficiencies include excessive breakage of green balls in the balling vessels, delayed response of the balling process to corrective measures applied to feeding operations, and erratic control. Furthermore, in heretofore conventional equipment, irregularities calling for the exercise of control and the imposition of corrective measures are difficult to detect because of the masking effect of the circulating load.

In a prior art effort to improve the operation of green ball production equipment and yield of green balls, a scraper bar was proposed. The object of this bar element was to establish and maintain a smooth and even surface on the coating of fines on the inside of the balling vessel so that ball accretion would occur gradually and at a regular rate. However, the resulting substantial elimination of friction between the green balls and the surface on which they were supported in the vessel precluded the realization of this general objective and lead toward the opposite result, i.e., the breakage and degradation of the green balls due to impact resulting when these balls slipped across the smooth supporting surface, hitting other balls or an abutment within the vessel. Actually, under minimum fricton conditions slippage of the fines will prevent balling altogether.

Another prior art effort involving the use of the scraper bar failed to improve balling operations although the scraper bar was used in such a way as not to provide the aforesaid smooth even surface characteristics. In this instance, the formation of green balls and the accretion of them could not be satisfactorily carried out despite the face that the breakage and degradation of the green balls due to impacts was thereby substantially eliminated.

We have discovered that the rate of green ball protection can be increased to a surprising extent by departing from the heretofore known practice of agglomerate production involving the use of a single drum apparatus. We have also found that this result can be obtained without in any way sacrificing the quality of the green balls while substantially increasing yields. Furthermore, we have found that these results can be secured while reducing labor costs by about 50%, eliminating heretofore essential auxiliary classification equipment and substantially reducing power and space requirements. More specifically, we have discovered that centrifugal force and peripheral speed effects can be controlled under certain circumstances so that green balls can be formed and separately rerolled in a single device having radially-spaced processing zones. Also, we have found that it is possible to carry out balling operations on a commercial scale and at high feed rates without either excessive green ball breakage or entrainment of fines and undersize material in the discharge from the vessel. In fact, classification as to size in accordance with our discovery can be surprisingly sharp and, moreover, may be adjusted for any predetermined green ball size desired. Still further, we have found that undersize green balls and fines intentionally or inadvertently discharged from the primary vessel or zone can be automatically and continuously collected and returned for nucleation or accretion and ultimate discharge in the desired form. Additionally, we have discovered that the results unsuccessfully sought by those who proposed the scraper bar and the use and control of moisture with fine materials for balling can now be consistently obtained by combining these and other features in a certain critical manner. A further important discovery we have made is that the value of a green ball, i.e., the proportion of iron ore in a green ball, can be materially increased over that hitherto obtainable with a given grade of iron ore fines without adversely affecting the physical characteristics of the ball and without increasing the cost of the balling operation by a tenth of the corresponding amount.

On the basis of these discoveries, we have invented a process and an apparatus which are new and hitherto unknown in operations of this general type. In putting into operation the present novel process and apparatus, we have found that important advantages in addition to those set out above can be obtained, some of them for the first time in agglomeration operations of this type and others for the first time in combination with each other.

For one thing, classification as to green ball size is substantially improved in accordance with this invention and superior firing bed condition, particularly as to back pressures, are thus more readily established. Furthermore, this result is obtained through the elimination of heretofore essential equipment, i.e., by means of a single element instead of the conventional drum, screen and conveyor combination previously necessary for recycling undersize material. Still further, green balls made according to our present method and by this novel apparatus have uniformly smooth surfaces which represent the ideal condition because of gas flow characteristics in green ball beds during firing.

The method of this invention is applicable generally to commercial balling operations and comprises the steps of rolling together in a primary balling zone moistened, finely-divided material, separating and removing green balls of predetermined size from fines and smaller green balls in the said primary zone, moving the thus separated green balls through an intermediate non-balling zone, rolling the thus removed green balls together with moistened fines in a secondary balling zone, and finally separating and removing green balls of the ultimate desired zone from fines and smaller green balls in said secondary zone. Preferably, this process is carried out commercially in a continuous manner rather than batchwise, the several steps being conducted continuously and simultaneously with new fines being fed into the balling vessel at a rate corresponding to the rate of discharge of the fines in the form of finished green balls, due regard being had for the limits imposed on feed rates by the capacity of the disc and green ball diameter requirements. It will, however, be understood that this process may be carried out in a manner such that some of the steps are operated intermittently as, for example, in the separating and removing of agglomerates of predetermined size from the separate zones of the vessels employed in the operation. Furthermore, agglomerating in accordance with this invention may be carried out on an essentially continuous basis even though, in fact, all the steps generally described above are conducted intermittently. Also, it is preferable in practicing this method to remove undersize green balls from the secondary balling vessel or zone and to return them to the primary vessel or zone; and, for best results, this should be done on a more or less continuous basis even when the equipment used is such that discharge of undersize material from the primary zone or vessel is not excessive.

As we have operated the process of our present invention to advantage, we have carried out steps in addition to those set forth above with the objective of applying to the full-size green balls a coating of finely-divided fuel to aid in the firing of these masses to convert them into indurated pellets as described in detail in our aforesaid copending application Serial No. 587,393. Alternatively or additionally, fuel may be incorporated within the green balls suitably by adding fines of coal or coke breeze in balling zones. This latter practice may prove advantageous when fines of magnetite are being balled or where a clinker or cluster product is desired for use as open-hearth furnace feed or charge.

Briefly described in its broad apparatus aspect, the present invention comprises a device for carrying out the above described method in which an inner, hollow cylindrical member is provided as a primary balling chamber which is adapted to be mounted for rotation with its axis at an acute angle to the horizontal. In a preferred form, the device includes an annular abutment portion which slopes relative to the base and to the side wall of the cylinder and merges with the inside surfaces of said base and side wall to prevent static packing of finely-divided materials while the vessel is rotating during balling operations. Alternatively or additionally, this device will include a generally cylindrical outer member of enlarged diameter which defines with the inner member an annular space adjacent to the outer end of the inner member constituting a secondary balling chamber. In this form, a radially-extending projection is disposed between the inner and outer members, serving as an end or bottom wall of the secondary chamber. As a modification, additional outer members and bottom walls may be provided to multiply the balling chambers.

Referring to the drawings accompanying and forming a part of this specification:

Figure 2:
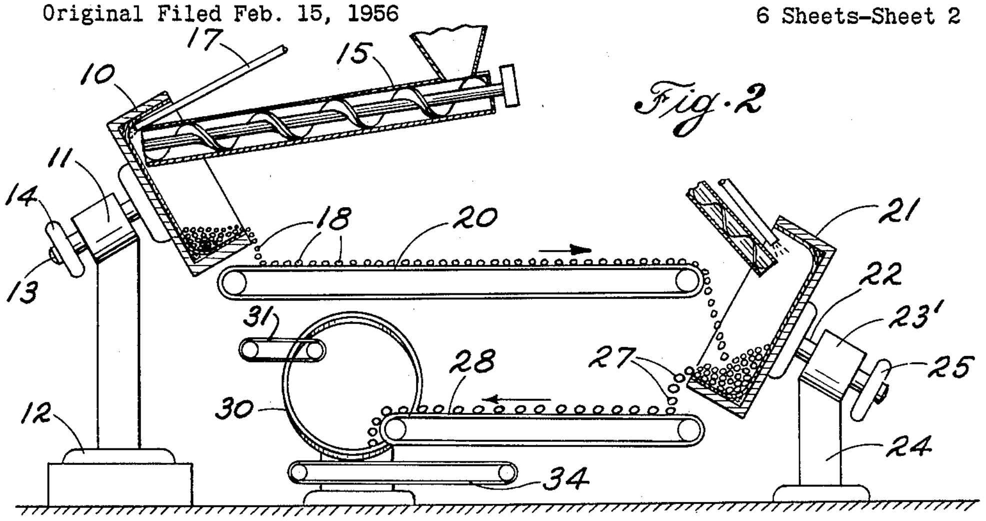
FIGURE 2 is an elevational sectional view, partly diagrammatic, of apparatus carrying out the method of this invention.

The apparatus illustrated in FIGURE 2 comprises a hollow, shallow, cylindrical body 10 which is mounted for rotation on its axis on an angle of about 60° on a bearing 11 carried by a pedestal 12. A drive shaft 13 extends axially of the vessel from the lower portion thereof through bearing 11 and is provided with a gear 14 for driving engagement with suitable motor and power transmission means (not shown). A screw conveyor 15 is disposed with its inner end in the upper portion of vessel 10 for delivery of finely-divided iron ore or the like into the vessel during balling operations. A water spray is directed into the vessel by means of a line 17 which is connected to a suitable source of water under pressure (not shown). Under ideal operating circumstances it will not be necessary to use line 17, as water delivery into this balling machine would be by the fines themselves. When the fines, as filter cake, are delivered into this machine they may not normally contain sufficient moisture for ball nucleation (9½% moisture representing the optimum condition) because of evaporation effects and fluctuations in filter operation. Furthermore, it will be understood that the position of the spray with respect to the vessel may be varied from that illustrated and that the best spray position under one set of conditions will not necessarily represent the best situation under another set of conditions.

Green balls 18 of predetermined size are formed in vessel 10 as it is operating, being rotated continuously at a regulated rate, and are discharged over the lip of the vessel onto an endless belt conveyor 20 for transfer to a second saucer-like vessel 21. Vessel 21, like vessel 10, is mounted for rotation on its axis at an angle to the horizontal, being carried by its shaft 22 in bearing 23 supported on pedestal 24, and is provided with driving gear 25 keyed to shaft 22 and is operatively associated with driving means (not shown). Green balls of predetermined size are formed in vessel 21 as it is rotated and are substantially continuously discharged over the lower lip portion of the vessel, as shown, and transported by an endless conveyor belt 28 to a third vessel 30 where these green balls are rolled together with coal or coke breeze to provide a finished coat of fuel in accordance with the method of this invention as described above. Vessel 30 is suitably of the same construction as vessels 10 and 21 and is driven in the same manner and with its axis at an angle to the horizontal in accordance with the preference of the operator and the thickness of the fuel coating desired on the green ball product. A screw conveyor 31, suitably of construction and motor operation substantially like conveyor 15, is provided for the delivery of fuel into vessel 30, the inner end of the conveyor being disposed in relation to vessel 30 in generally the manner of conveyor 15 and vessel 10, just described above. Finished, fuel-coated green balls rolling over the lower lip portion of vessel 30 are intercepted by an endless belt conveyor 34 and carried thereby to a suitable storage point or a traveling grate or other firing apparatus, as desired.

Figures 4, 6:
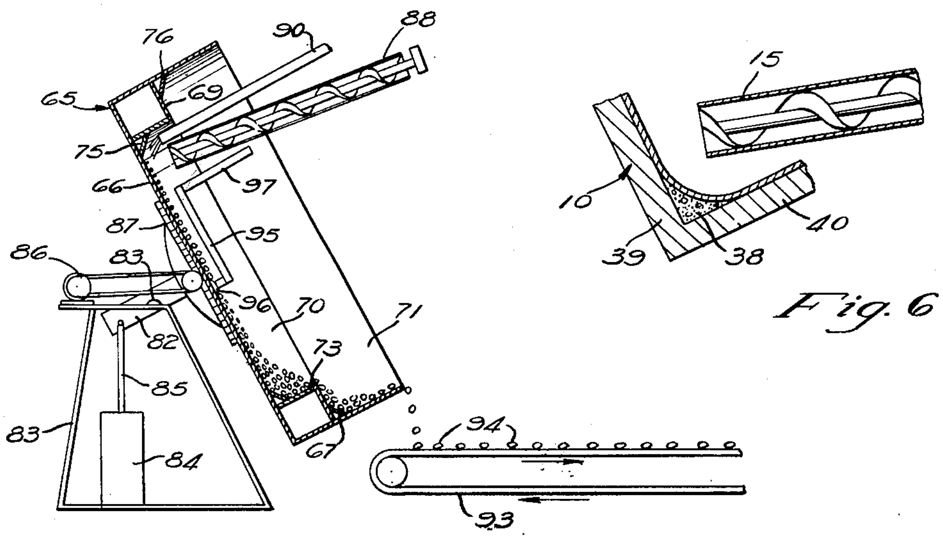
FIGURE 4 is a view similar to FIGURE 3 of another type of apparatus embodying the present invention.
FIGURE 6 is an enlarged fragmentary sectional view of the inner end of a portion of the agglomerating vessels illustrated in FIGURE 2.
Figure 5:
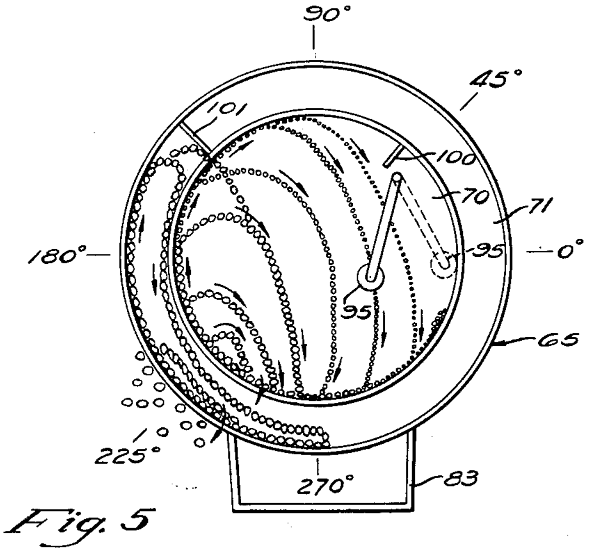
FIGURE 5 is a front elevational view of the agglomerating device similar to that illustrated in FIGURE 4, showing the pattern of agglomerate travel as the device is operated to carry out the aforesaid method.

As shown in FIGURE 6, the vessel 10 incorporates a novel feature in the form of an annular abutment portion 38 which provides a surface of generally hyperbolic, concave form in transverse cross-section. Abutment 38 fills the corner defined by base 39 and side wall 40 of the vessel, promotes free rolling of agglomerates and fines and serves to prevent static packing and lumping of the finely-divided material delivered into the vessel by conveyor 15 and crushing of green balls. In the embodiment illustrated herein, abutment 38 comprises wire mesh or screen which has been disposed across into the corner portion of the vessel and shaped to provide the curved section mentioned above. A mass or bed of suitable cementitious material such as a sodium silicate, Portland cement or moist ore fines is provided under screen to provide support for it and maintain the desired conformation in abutment 38. However, whether this abutment member is of cemented or other material, or is actually formed in the vessel metal itself, it will be effective to promote free rolling and to prevent tucking of small fragile seeds and flocs into a deep corner space where crushing compressive stresses or loads may be exerted upon them. Another advantage and function of this abutment element is to promote or permit the release of finely-divided material and fragile seeds and flocs in the 150° to 180° sector of vessel rotation, as illustrated in FIGURE 5. This, in turn, results in relieving impingement on the stationary cutter at 100° so that the small seeds are not degraded through cutter action to an excessive degree. The general location of a cutter element in the vessel 10 is indicated in FIGURE 5 which will subsequently be described in detail, the cutter being eliminated from FIGURE 2 in the interests of clarity.

Figure 3:
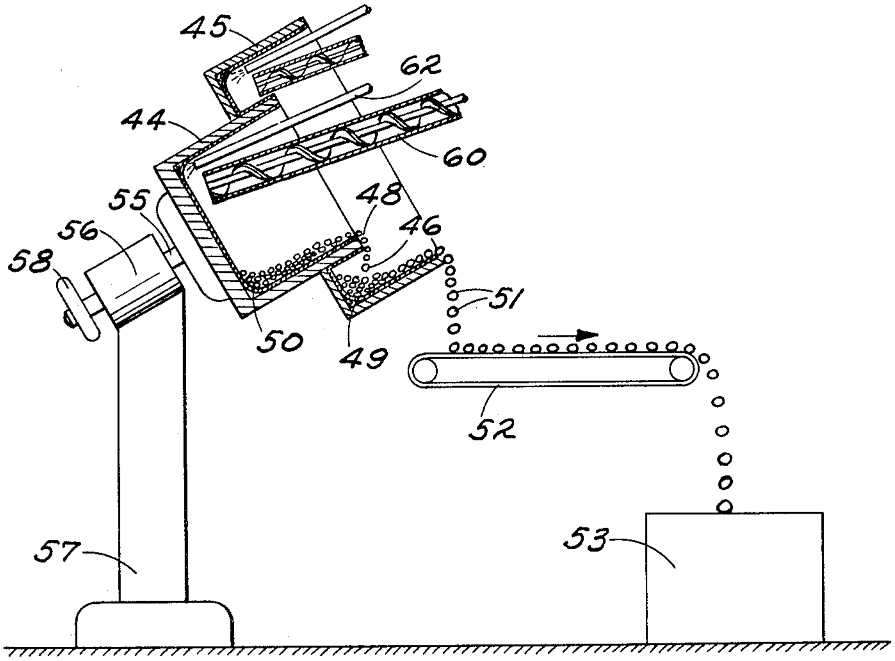
FIGURE 3 is an elevational sectional view of apparatus embodying the present invention for carrying out the method described above.

The balling apparatus of this invention shown in FIGURE 3 comprises a cylindrical vessel 44 of depth approximately twice that of vessels 10 and 21, providing a primary balling chamber. A cylindrical outer member 45 of enlarged diameter is secured to cylinder 44 toward the outer or upper end of the side walls of cylinder 44 and cooperates with the latter cylinder to define an annular space 46 adjacent to and surrounding the outer end of cylinder 44 and constituting a secondary balling chamber. The side wall of member 45 extends upwardly or outwardly beyond the open end of vessel 44 so that green balls of predetermined size are caught in member 45 on rolling over the outer lip of cylinder 44.

Cylindrical members 44 and 45 are provided with an annular abutment 49 and 50 of curved surface so that instead of having the usual corner pocket at the intersection of the base and side wall, this cylinder offers smooth contours between the inner surfaces of the side walls and the inner surfaces of the bottom or base elements. The purpose and function of this abutment member is essentially the same as that of abutment 38 of FIGURES 2 and 6, as described above. However, in this instance, the abutment member is integral part of the cylindrical body, being formed in the metal of the member.

Green balls 48 processed in chamber 46 are gradually worked toward the lip of member 45 and are discharged from ring 45 when they have been developed to a predetermined size. This discharge 51 is intercepted on leaving cylindrical member 45 by an endless belt conveyor 52 by means of which it is carried to a collection or storage point 53.

The mounting and driving means for the apparatus of FIGURE 3 comprising vessel 44 and ring member 45 is suitably essentially the same as that described in reference to the FIGURE 2 agglomerating vessels. Thus, a drive shaft 55 is mounted coaxially of vessel 44 and member 45 and secured to the base of the vessel assembly extending downwardly therefrom and being journalled in bearing 56 supported on pedestal 57. The lower end of shaft 55 is provided with driving gear 58 for operative association with suitable conventional driving means (not shown) whereby vessel 44 and member 45 are rotated on their common axis at a rate according to the nature of the feed material, the rate of feed delivery, the size of the green balls desired, and similar factors.

Ore fines are delivered into the primary and secondary chambers of vessel 44 by means of two conventional feed assemblies indicated at 60 and 61, the rate of feed delivery being regulated according to the operating conditions and the capacity of the equipment, suitable drive means (not shown) being provided for this purpose. Moisture in the form of water sprays is delivered into both said balling chambers by means indicated at 62 and 63.

In the apparatus of FIGURE 4, a vessel 65 having two concentric chambers is provided for carrying out the method of this invention. Thus, this vessel is of generally cylindrical form having a base 66 and a side wall 67 and open upper end from which green balls are discharged. An annular, step-like abutment 69 is provided within vessel 65, dividing the vessel into an inner nucleating or primary balling chamber 70 and an outer or secondary balling chamber 71, green balls 72 of predetermined size being discharged from chamber 70 over the edge 73 of abutment 69 into chamber 71 as the vessel is rotated. Chambers or zones 70 and 71 are spaced apart radially and axially and an intermediate, non-balling zone in the form of edge 73 and adjacent portions of vessel 65 is disposed between them. A conic section 75 of dead plate is mounted in chamber 70 in abutting relation to the riser portion of step 69 and the inner surface of base 66. A similar conic section 76 which is necessarily of larger diameter than section 75 is provided in chamber 71 abutting the tread portion of step 69 and the adjacent inner surface of the side wall 67. Again, the purpose of these sections 75 and 76 are those of abutments 38 and 49 as described in detail above.

The steps defining the separate balling zones are of dimensions such that the retention time in each zone is near the optimum for the particular material to be balled in the vessel. By way of illustration, we have found that in producing green balls from iron ore fines, good results can be consistently obtained when the lip depth is six inches and the disc diameter is three feet. Likewise, the depth of the lip may be as great as nine and one-half inches when the disc is four and one-half feet in diameter. Smaller or shorter lips will also be satisfactory but larger or higher ones are not desirable.

Vessel 65 is mounted for rotation on its axis at an angle to the horizontal by means of an axial shaft 82 attached to base 66 and extending downwardly therefrom for supporting engagement with a pedestal 83. The shaft is carried by the pedestal in adjustable relation so that vessel 65 may be turned at any desired angle to regulate the size of green balls discharged from chambers 70 and 71 in accordance with the factors and conditions governing the action of this apparatus in carrying out the method of this invention as will be subsequently described. Angular adjustment of the vessel may be accomplished by means of a hydraulic or pneumatic piston cylinder assembly indicated at 84, piston rod 85 being connected to the lower free end of shaft 82 below pivot point 83.

Driving means for revolving the vessel on its axis is indicated at 86 as motor means and a V-belt drive and a ring gear 87 mounted on base 66.

The delivery of ore fines or similar material into vessel 65 and particularly into chamber 70 is accomplished by means of a screw conveyor 88 driven by any suitable conventional means (not shown). Water in the form of a spray is delivered into chamber 70 in accordance with the requirements of the method of this invention by means of a line 90.

An endless belt conveyor 93 is provided to receive the green balls 94 discharged from vessel 65 over the lip of side wall 67 carrying them to a point of storage or to a traveling grate or other apparatus for firing or further processing.

For the purpose of dressing and conditioning the inner surface of the portion of base 66 within chamber 70, an oscillating trimming and dressing bar 95 is disposed with its end portion 96 adjacent to the said base surface. By means of a lever 97 and drive means (not shown) coupled to lever 97, bar 95 is driven continuously during the period of use of vessel 65 in balling operations. Unlike the scraper bar of the prior art mentioned above, bar 95 is not used in accordance with our invention in such a way that an undesirable, smooth, even surface is produced in the balling zones. Instead, this bar assures the maintenance of an unpolished surface on the coating of moist fines in the vessel to promote snowball-like growth of green balls.

As shown in FIGURE 5, a stationary trimming and dressing bar 100 and a second similar bar 101 are provided in chambers 70 and 71, respectively. Bar 100 is located at about 50° or one o'clock adjacent to the outer periphery of chamber 70 for trimming and conditioning the vessel coating surface in the area of abutment 75.

Bar 101 extends entirely across chamber 71 at about 130° to intercept any green balls and fines carried too high by rotational motion of vessel 65 and thus return them to chamber 70 for further growth, as will be described.

The apparatus of FIGURES 4 and 5 is operated continuously by feeding a shredded concentrate in water mixture into the rim at about 350° when vessel 65 is being rotated in a clockwise direction. The feed material tends to tuck under cascading seeds of various sizes and is lifted around the periphery of chamber 70 without tumbling to about 100° where the material breaks loose from the periphery and is projected by gravity and friction across the clean surface of the vessel base in a direction concurrent and lateral to the vessel motion, but at a greater velocity. Small flocculated masses tend to form small spherical seeds during this initial fall as a result of vessel motion, and these new seeds fall upon new layers of feed and they are statically transported to about 120°. At that point, they are projected across the vessel deck or base surface with less horizontal displacement than the new feed. These small spherical seeds are enlarged through accretion of fresh adherent feed in this second tumble, and these enlarged seeds fall on the newer seeds and arrive in a shear zone of uplifting and tumbling masses. Random motion prevails in the shearing zone and enlarged seeds are subjected to attrition whereby the larger seeds grow at the expense of smaller ones which tend to seek their own specific orbit. The larger seeds tend to migrate to the top of the tumbling masses and cascade on the surface in relatively small generally elliptical orbits so that these green balls nuclei are raised near the periphery and tumbled on the base surface near the edge of chamber 70. Eventually, when the green balls have reached predetermined proportions, they overflow the rim dividing chamber 70 from chamber 71 at a zone of emergence between 180° and 270°. This overflow is the result of a displacement action exerted by new feed and by the rotary motion of the balling vessel. The green balls thus overflowed are cascaded in a sausage-shaped orbit in chamber 71, and are further enlarged through pick-up of finely-divided material which surprisingly preferentially adheres to the surface of the tumbling green balls rather than nucleating into individual agglomerates of smaller size. Incoming green balls cause tumbling larger green balls to be rejected by displacement from chamber 71 in a zone of emergence of about 225°.

The apparatus illustrated in FIGURES 7 to 11, inclusive, generally resembles the devices of FIGURES 4 and 5, differing therefrom in the details of construction of the balling vessel itself. The drive means and auxiliary equipment may suitably be essentially the same in both cases. Vessel 105 is generally cylindrical and relatively shallow and, like vessel 65, in use is mounted for rotation on its axis disposed at an angle between about 20° and about 70° to the horizontal, depending upon the nature of the fine material to be processed. A series of annular steps which define three separate balling zones and a reroll zone for the formation and progressive growth of green balls and for final rerolling of these balls to apply thereto a suitable coating of fine ore of low moisture content or fuel to facilitate subsequent firing operations. These steps or zones are arranged concentrically, the innermost zone 107 being for nucleation, green ball nuclei being formed therein by the action of the balling vessel rotating on its axis to cascade fine material continuously over a condition surface 109 of compacted fines covering the interior of the vessel in this zone. A secondary balling zone 110 is adjacent zone 107, while a third balling zone 111 is disposed outwardly of zone 110 and adjacent thereto. Zone 110 is provided with a layer 112 of compacted fines which is a continuation of layer 109, zone 107 and the inner surface of the vessel portion defining zone 111 is similarly coated with a layer 113 of compacted fines. Zones 107, 110 and 111 are separated by intermediate non-balling areas or zones 115 and 116, respectively, these being the edge portions of the annular steps over which the nuclei and green balls travel in their progressive movement radially and axially outwardly from the innermost zone of the vessel.

Figure 8:
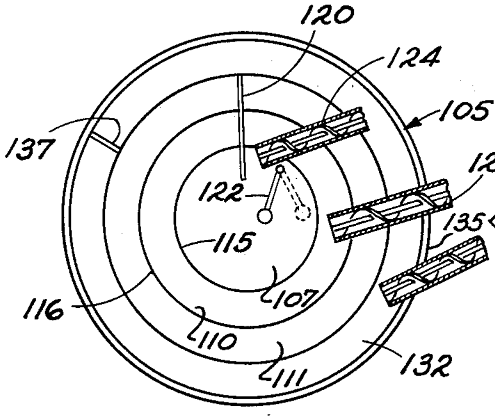
FIGURE 8 is a view looking into the open end of the apparatus of FIGURE 7.
Figure 9:
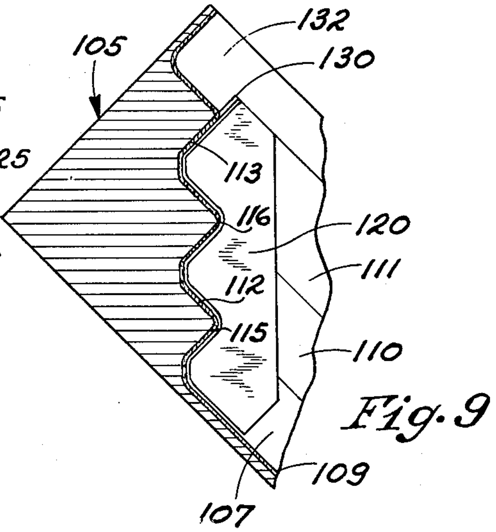
FIGURE 9 is an enlarged, fragmentary, sectional view of the FIGURE 7 device, showing the surface trimming and conditioning means in position within the balling vessel.

The coating of compacted fines extending over the inner surface of vessel 105 from the innermost part thereof to the reroll section is maintained in condition to promote formation and growth of green balls by means of a stationary bar 120 disposed at 12 o'clock, as indicated in FIGURE 8. Bar 120 is contoured to provide a uniform, relatively small gap whereby the thickness of the layer of fines is regulated. Control of the critical feature of surface condition is also obtained by means of an oscillating trimming device 122 disposed within zone 107. The action of these two coating-conditioning devices is such that coatings are established and maintained throughout the balling operations which afford sufficient frictional contact for fines, nuclei and green balls that regular and rapid green ball growth is consistently obtained.

Another critical factor in the production of green balls of the desired characteristics set forth above is the moisture content of the fine materials undergoing treatment in vessel 105. Filter cake fines containing about 8% to about 11% moisture are introduced into vessel 105 by means of screw conveyors 124 and 125, serving zone 107 and zone 110, respectively. When the moisture content of these fines is less than the optimum for nucleation of green balls or green ball growth, adequate moisture is introduced into zones 107 and 110 by means of water sprays delivered through lines 127 and 128, respectively. Preferably, these introductions of fine materials into zones 107 and 110 are continuously and at regulated rates in accordance with the rate of green ball formation and growth so that not only the size of the green balls produced is closely controlled but also the rate of that production is maintained at a maximum.

An annular flange 130 is formed in vessel 105 to divide balling chamber 111 from reroll chamber 132 and thereby prevent flow of finely divided fuel from the reroll chamber into the balling zones.

Conveyor 125 should always deliver filter cake to the disc at a moisture content of 8 to 11%, but conveyor 125 may deliver filter cake that has a moisture content of 8 to 11%, but we have found it advantageous to add filter cake with a moisture content of 4–6%. This would allow conveyor 135 to add powdered fuel to the green pellets. If internal fuel is added, this step would be eliminated.

Figure 7:
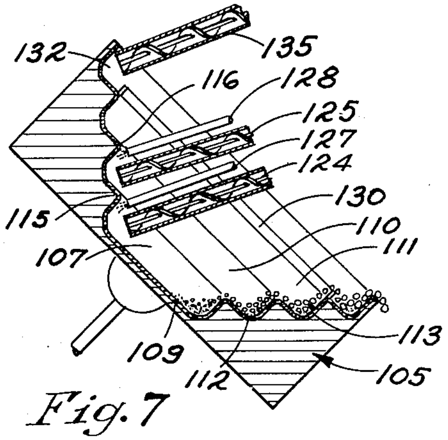
FIGURE 7 is a fragmentary, transverse, sectional view of another balling apparatus embodying the present invention.

In the operation of this FIGURE 7 apparatus, finely-divided iron ore, suitably of moisture content between about 8% and 11%, is introduced into zone 107 and zone 110 and by action of trimming and conditioning means 120 and 122, a coating of compacted and finely divided material is established on the inner surface of vessel 105 in the balling zones. Moisture is added as required in the form of water sprays by lines 127 and/or 128 in order to produce the optimum surface condition for ball formation and growth.

Figure 10:
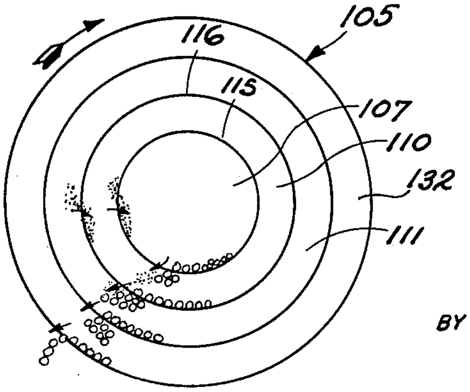
FIGURE 10 is a diagrammatic view illustrating the flow patterns of green balls and fines between the several zones within the balling vessel.

As vessel 105 is continuously rotated on its axis and feeding of fines into zones 107 and 111 continues, green ball nuclei produced in zone 107 are displaced as they grow in size by fresh feed material and are moved into zone 110 through the first intermediate non-balling zone dividing zones 107 and 110. Depending upon the operational characteristics of vessel 105, such as the rate of rotation, the rate of feed and the rate of nucleation, a smaller or larger amount of fine material may flow together with green ball nuclei and small green balls into zone 110. The rate of feed of fines by conveyor 125 is adjusted according to carryover of fines into zone 110 and according to the rate at which finely-divided material flows back into zone 107 from zone 110, as indicated in FIGURE 10.

Displacement of balls of larger size occurs in zone 110 as feed thereinto continues via zone 107 and conveyor 125. These larger balls are moved through the second intermediate non-balling zone and received in outer balling zone 111 where their accretion continues until they are of the final desired size and are displaced by smaller size material falling into zone 111 from zone 110. Again finely-divided material in varying amounts will accompany flow of displaced green balls from zone 110 to zone 111 and there will be a back flow of this finely divided material into zone 110, as indicated in FIGURE 10.

Balls of the finally desired size displaced from zone 111 are caught in reroll zone 132 and by virtue of the fact that their surfaces are moist, they are readily coated with relatively dry finely-divided material as they are rolled in zone 132 through the continued rotation of vessel 105. This ball coating operation in accordance with our discovery, does not require fines of the relatively high moisture content essential to successful green ball nucleation and growth. For this reason and because it is highly desirable to establish the highest possible iron value-moisture ratio in finished green ball products, fines are prevented, in accordance with this invention, from carrying over to any material degree from zone 111 to the reroll zone and essentially the only fine material in the reroll zone is the 4% to 6% moisture content iron ore delivered by conveyor 135. Finished and coated green balls are displaced from the vessel by continued flow of green balls from zone 111 and additions of material by means of conveyor 135. To insure good rerolling results, vessel 105 is equipped with a radially-disposed stationary scraper bar 137 located in reroll zone 132 at 10 o'clock. Bar 137 maintains a surface in reroll zone 132 which is conductive to good tumbling action of both green balls and powdered material, but unlike bar 120 is not effective to return fines and undersize balls to inner zones for agglomeration or further growth.

Figure 12:
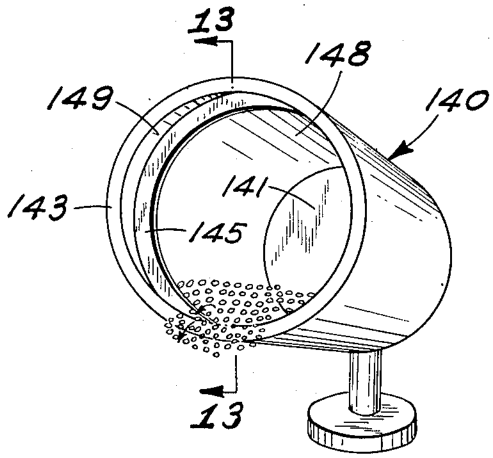
FIGURE 12 is a perspective view of another form of balling device of this invention.
Figure 13:
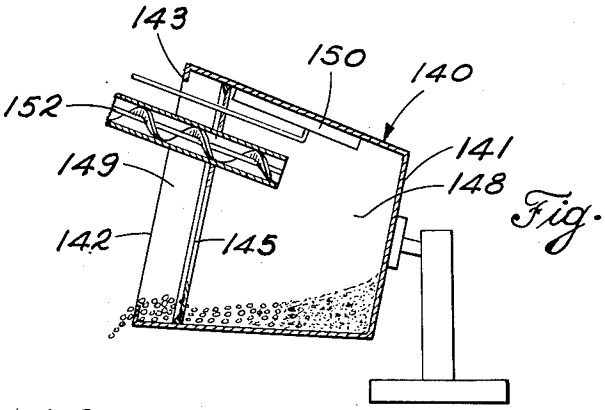
FIGURE 13 is a view taken on line 13—13 of FIGURE 12 showing conveyor means and lining dressing means.

Vessel 140 of FIGURE 12 is in the form of a truncated cone and is closed at its smaller end by wall or floor 141 and open at its larger end 142 where a lip 143 is provided. Vessel 140 is mounted for rotation on its axis with end 142 directed upwardly, said axis being disposed at an angle to the horizontal, depending upon the material to be processed, the size of the ball products to be formed in this vessel, the rate of rotation of the vessel and similar factors. An annular body 145 is situated coaxially in vessel 140, constituting an axially extending dam which serves to divide the vessel into an inner balling zone 148 and an outer rerolling zone 149. This dam prevents overflow of relatively moist fines into the rerolling zone. A trimming and conditioning means comprising an endwise reciprocating bar 150 is disposed in vessel 140 in spaced relation to opposed side and bottom wall portions of the vessel to dress the surface of the coatings of compacted fines on the interior of the vessel and thus promote green ball formation and growth, as described above. A conveyor 152 serves to deliver fine material into zone 148 for balling, requisite moisture being provided in any convenient manner.

As indicated in FIGURE 12, when vessel 140 is rotated on its axis by suitable means such as described in reference to FIGURES 4 and 5, finely-divided material ball nuclei and small and large green balls are moved about in the vessel with the result that the larger green balls, upon reaching predetermined size, are discharged by displacement from the balling zone of the vessel over dam 145 into reroll zone 149. A characteristic of this device is the progressive travel of nuclei and green balls axially and radially outwardly of the vessel as these nuclei and balls grow in size. Another characteristic of this apparatus is the flow of a portion of fine material with the nuclei and green balls from the inner portion of the vessel toward the dam and the counterflow of fines from outer portions of the balling zone toward inner portions thereof. Still another feature of this device is the sharp separation which is effected between the green balls of predetermined desired size and smaller balls and fines in the discharge from the balling zone.

Figure 14:
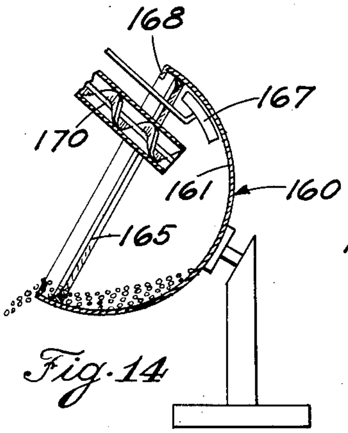
FIGURE 14 is a vertical sectional view of still another type of device of this invention.

Vessel 160 illustrated in FIGURE 14 is generally bowl shaped, having a concave, arcuately-formed inner surface 161. Vessel 160 is disposed on suitable mounting means and connected to driving means of the type illustrated in FIGURES 4 and 5, the axis of vessel 160 being at a greater or lesser acute angle to the horizontal, depending upon the conditions under which balling is to be carried out. An annular dam 165 is formed within the vessel 160 adjacent to its outer end to divide the vessel interior into an inner balling zone and an outer reroll zone. Within the balling zone of the vessel, a reciprocating bar 167 is mounted in spaced relation to the surface of the vessel and is contoured to provide a substantially uniform gap to effect trimming and conditioning of a layer of compacted and finely-divided material whereby ball formation and growth is promoted in the operation of the vessel. Green balls are discharged from vessel 160 over lip 168 as finely-divided iron ore of requisite moisture content is introduced into the balling zone by means of a conveyor 170 and make-up water is provided in the form of a spray when additional moisture is required for ball nucleation and growth. Fines of relatively low moisture content are introduced into the reroll zone by conveyor means (not shown) to provide through the action of the balling vessel a finished coating of iron ore or fuel on the green balls discharged from the balling zone.

Operation of vessel 160 is similar to that of vessel 140 in that the characteristics described with reference to vessel 140 are likewise inherent in vessel 160. Thus, following the establishment of a layer of coating of compacted fines on the surface of the balling zone, part of vessel 160, balling is rapidly carried out continuously with the rate of rotation of the vessel on its axis and the rate of feed of fines and moisture in the balling zone and relatively dry fines in reroll zone being regulated for the consistent production of the desired results.

Figures 15, 16:
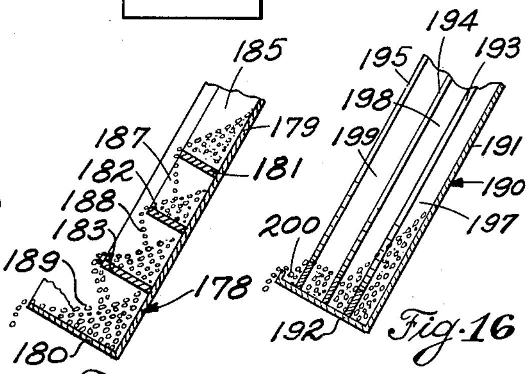
FIGURE 15 is a fragmentary, sectional vertical view of another balling device of this invention; and, FIGURE 16 is a view similar to FIGURE 15 of another balling device embodying this invention.

Ball disc 178 illustrated in FIGURE 15 is of shallow, generally cylindrical form, having an end wall 179 and a short side wall or flange portion 180. Three concentrically disposed rings 181, 182 and 183 are provided to divide the interior of vessel 178 into separate zones, the rings being welded to end wall 179 in spaced relation to each other according to their heights. Thus, an inner nucleation zone 185 is provided, finely-divided moist material being delivered therein and subjected to the rotary motion of vessel 178 as it is turned on its axis to cause fine particles to agglomerate as described above. Nuclei and small green balls formed in zone 185 are displaced over dam 181, being received in balling zone 187 where they are rolled together with additional fine material, resulting in further growth. Green balls of predetermined size are selectively displaced from zone 187, flowing over ring 182 into another balling zone 188 where further accretion of these balls may occur. Displacement of green balls of predetermined desired size from zone 188 results in these balls being collected in the outermost or reroll zone 189 which is defined by ring 183 and flange 180 of the vessel. Discharge of the finished green balls from the vessel is accomplished by displacement of these balls from reroll zone 189 and is regulated by controlling the rate of displacement of the products from inner zones 185, 187 and 188.

Generally, the width of the various balling zones and reroll zone 189 will be related to the height of rings 181, 182 and 183 as otherwise one or more of these zones will become overloaded and balling conditions and results will be poor.

Balling vessel 190 shown in FIGURE 16 is a shallow, generally cylindrical container which is open at one end and is closed at the other by end wall 191, side wall 192 being welded to end wall 191 so that the vessel is essentially water-tight. Three concentric radially disposed and axially spaced annular ribs 193, 194, and 195 are welded to the side wall 192 of the vessel to provide four separate annular zones for the agglomerating process of this invention. A green ball nucleating zone 197 is provided in the inner part of vessel 192, being divided by end wall 191 and ring 193. Fine moist material contained in zone 197 is agglomerated through the rotary motion of vessel 190 as it is driven on its axis at an angle to the horizontal as illustrated with the results that nuclei of green balls and small green balls are produced. The products of zone 197 are displaced from that zone by the introduction of additional quantities of material thereinto and these products are collected in balling zone 198 defined by rings 193 and 194. Displacement of larger green ball products from zone 198 into zone 199 between rings 194 and 195 likewise occurs as additional material is delivered into zone 198. A reroll zone 200 disposed outwardly of ring 195 receives ball products discharged from zone 199 and in turn discharges reroll ball products by the displacement material, these products emerging from vessel 190 over the lip of side wall 192.

As the drawings show, certain relationships exist between the dimensions of the balling zones or troughs and the side walls of the several vessels. In general, the vertical depth of each balling zone or trough, or of the steps or ribs between adjacent zones or troughs, as measured at the lower segment of the vessel when it is in its rotating position, is less than the width of the zone or trough and is less than half of the axial height of the side wall of the vessel. See troughs 49 and 50 and rib 48 of FIG. 1, troughs 70 and 71 and ribs 73 of FIG. 4, and troughs 107, 110 and 111 and ribs 115 and 116 of FIGS. 7 to 10, and corresponding parts of FIGS. 11 to 16, inclusive.

Figure 1:
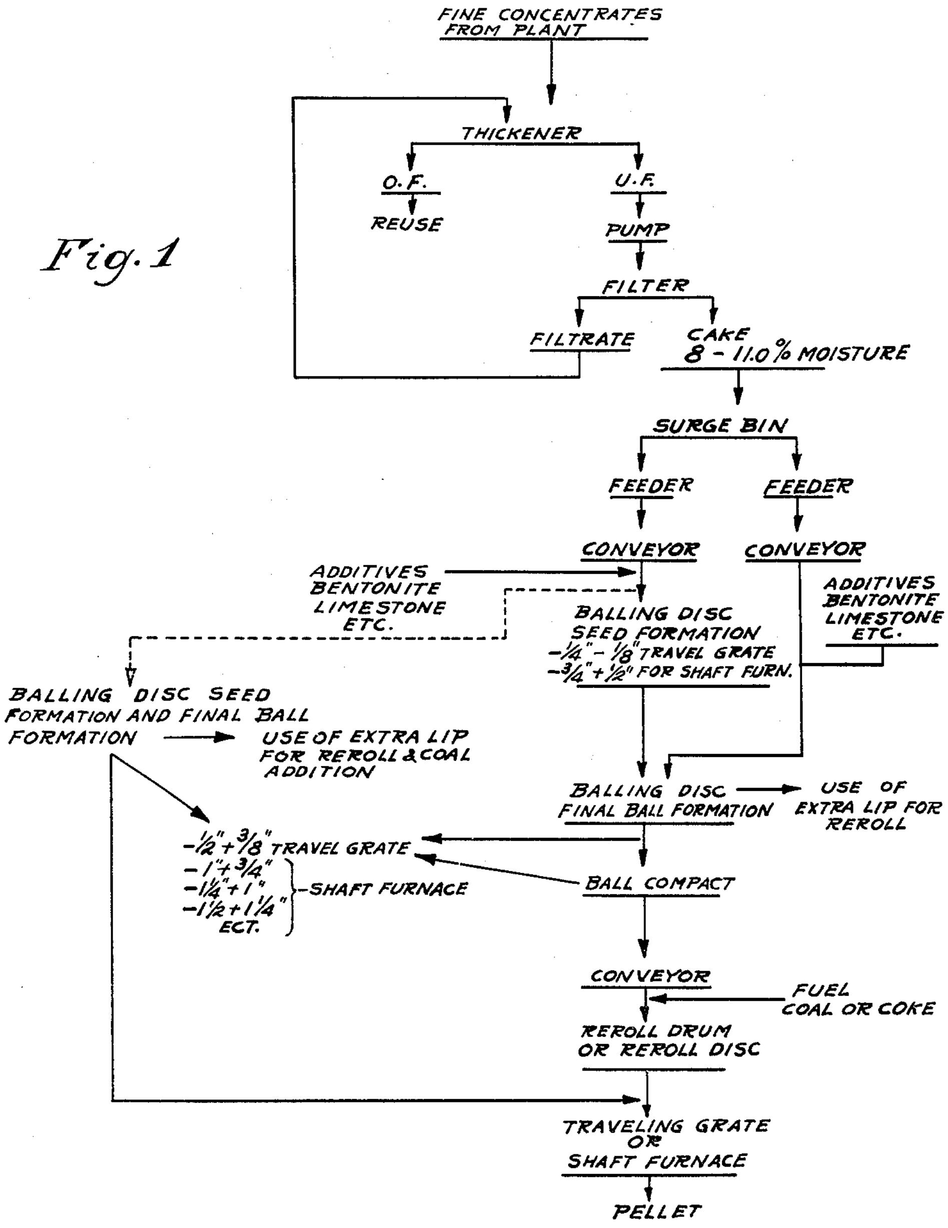
FIGURE 1 is a flow sheet which illustrates the part played by the method and apparatus of this invention in a commercial iron ore processing and pelletizing operation.

The purpose of the flow sheet of FIGURE 1 is to indicate the use of the present method and apparatus in the processing of finely-divided ore concentrates and the relation of this invention to other phases of ore processing. A further purpose of this diagram is to indicate alternatives within this invention whereby two or more balling discs may be used to produce the ball compact or where a single disc is employed for this purpose as illustrated in the drawings above described.

In carrying out the method of this invention in the flow sheet of FIGURE 1, the ore filter cake of 8% to 11% moisture content is mixed with a suitable quantity of bentonite or limestone or other similar additive material and then delivered into the agglomerating apparatus wherein water is delivered as a spray in sufficient quantity to promote agglomeration of the fine material. Preferably, this operation is carried out continuously whether apparatus of the type illustrated in FIGURE 2 or that exemplified in FIGURES 3 and 7 are employed, and agglomerating is likewise carried out continuously as the agglomerating vessel is revolved on its axis at a uniform rate. However, it is contemplated by the present invention that the delivery of feed material into the agglomerating vessel may be carried on intermittently, and the introduction of water into the vessel may likewise be discontinuous where it is desired to maintain a close control over the agglomerating conditions and the rate of discharge of finished agglomerates is not to be constant. Since, as indicated above, the ultimate size of the agglomerates is a function of the slope of the agglomerating vessel, the position of the agglomerating vessel is adjusted at the outset according to the size of the agglomerate product desired. In the preferred practice, as in the use of the device of FIGURE 4, the slope of the agglomerating vessel may be changed at intervals during operation by way of controlling the product size and the agglomerating conditions through the vessels in the course of their processing in the method of this invention.

It is preferable at the outset as well as throughout the period of operation of this invention to maintain a measure of control over the moisture content of the feed material, and it is desirable that the finely-divided feed be of substantially uniform moisture content within the range of 8% to 11%, as indicated above, as we have found that iron ore fines of moisture in that range are capable of adhering to a metal surface so as to provide a thin layer or coating on which small seeds and agglomerates may roll to produce growth through a snowballing effect. It happens that this snowballing tendency is most marked when these fine materials exhibit the greatest tendency toward adherence and coating on the agglomerating vessel wall. Adjustments in the moisture content to produce the ideal agglomerating condition may be made by intermittently or continuously delivering water into the agglomerating vessel in contact with the fines in process, and this may be considered a step in the present method. As the agglomerating vessel is rotated on its axis and the coating of finely-divided ore and additives in admixture is formed on the vessel walls, the step of trimming and conditioning this layer is carried out, preferably continuously, so that agglomeration is promoted. Thus, the layer or coating of fines is subjected to the action of a scraper bar which may be of the stationary or the oscillating type and which serves to limit the thickness of the layer of coating, removing excess fines preferably without producing any sort of polishing effect on the coating. Again, in analogy to snowballing the best kind of coating surface for accretion of agglomerates is one which will readily adhere to the agglomerates themselves with the result that part of the coating is lifted and carried away as the agglomerates travel across the surface of the coating in movement generated by the rotation of the agglomerating vessel.

Intermittently or continuously depending upon the rate and continuity of feeding of fine material into the agglomerating vessel, agglomerates of a predetermined size are separated and removed from the primary agglomerating chamber of the vessel. In the operation of the apparatus of FIGURE 2, this step of the method involves carrying the thus discharged agglomerates from a first vessel to a second vessel by suitable means such as the conveyor 20. By contrast, this step in the operation of the FIGURE 3 apparatus, for example, involves only the rolling of the agglomerates over the lip of the wall defining the inner or primary agglomerating chamber of vessel 42 and the catching of the thus discharged agglomerates in the reroll ring 43. In either instance, however, the separation of the agglomerates from the small agglomerates and seeds and/or fines is the result of a clasification which takes place in the primary vessel or chamber due to the action of the apparatus of this invention whereby a consolidated trickling phenomenon is induced by agitation and tumbling motions. The smaller flocs or seeds gravitate through the layers of larger seeds or agglomerates so that a stratified arrangement of sizes diminishing in diameter as the layers are oriented from the surface downward is established. Additional feed results in the uppermost layer being displaced from the primary vessel or chamber, while the other layers are retained therein. In commercial operations, however, this classification and separation are not perfect, and there is a tendency for relatively small quantities in the better practice to carry over in discharge into the secondary vessel or chamber with the intended agglomerate discharge.

Actually, in carrying out the method of this invention, advantage is taken of the fact that this tendency exists to a marked degree. Thus, in rerolling the agglomerates to produce agglomerates of the ultimate desired size, it is not necessary to provide additional means for delivering finely-divided material, feed or other forms of fines into the secondary zone. At the same time, however, we prefer to carry out a separation and removal of undersize agglomerates from the secondary zone and this may be accomplished continuously or intermittently according to the apparatus employed and the desires of the operator. As shown in FIGURE 5, scraper bar 101 performs this function automatically and whenever necessary, but there are other ways in which this step can be carried out and this result obtained, as those skilled in the art will understand. The object, in any event, is to prevent build up of excessive and undesirable quantities of undersize agglomerates in the secondary zone where they could impair the production of the ultimate desired agglomerate and could also find their way into the final product.

When the agglomerates reach the ultimate desired size in the secondary zone, they are separated and removed in accordance with this invention to a point of storage or apparatus for firing them or they may be rerolled with solid finely-divided fuel as described above to provide a fuel coating to aid in the firing operation. This rerolling is preferably carried out continuously in a third zone in the form of a second or a third agglomerating vessel, or more suitably in a second reroll ring, as shown in FIG. 2. However, in either case, we have found that it is not usually necessary to provide for introduction of additional moisture, the agglomerates discharged from the secondary zone having sufficient moisture in their surfaces to cause accretion and secure binding of substantially dry coal or coke breeze particles to form a continuous coating on the agglomerates.

As a final step, the agglomerates bearing a coating of fuel of desired degree of continuity and thickness are discharged from the third zone and in the better practice this step will be carried out essentially continuously and in generally the manner set out in relation to the separating and removal steps described in detail above.

Although we have used various devices of this invention and made careful observations and tests and many detailed studies of the motions and flows of the materials in these vessels in carrying out our present method, we are not certain what take place in this unique agglomerating operation. We have, however, developed a theory to explain the results which we have obtained and without limiting our claims to this invention in any way, we offer this theory by way of aiding others skilled in the art to understand this invention.

Figure 11:
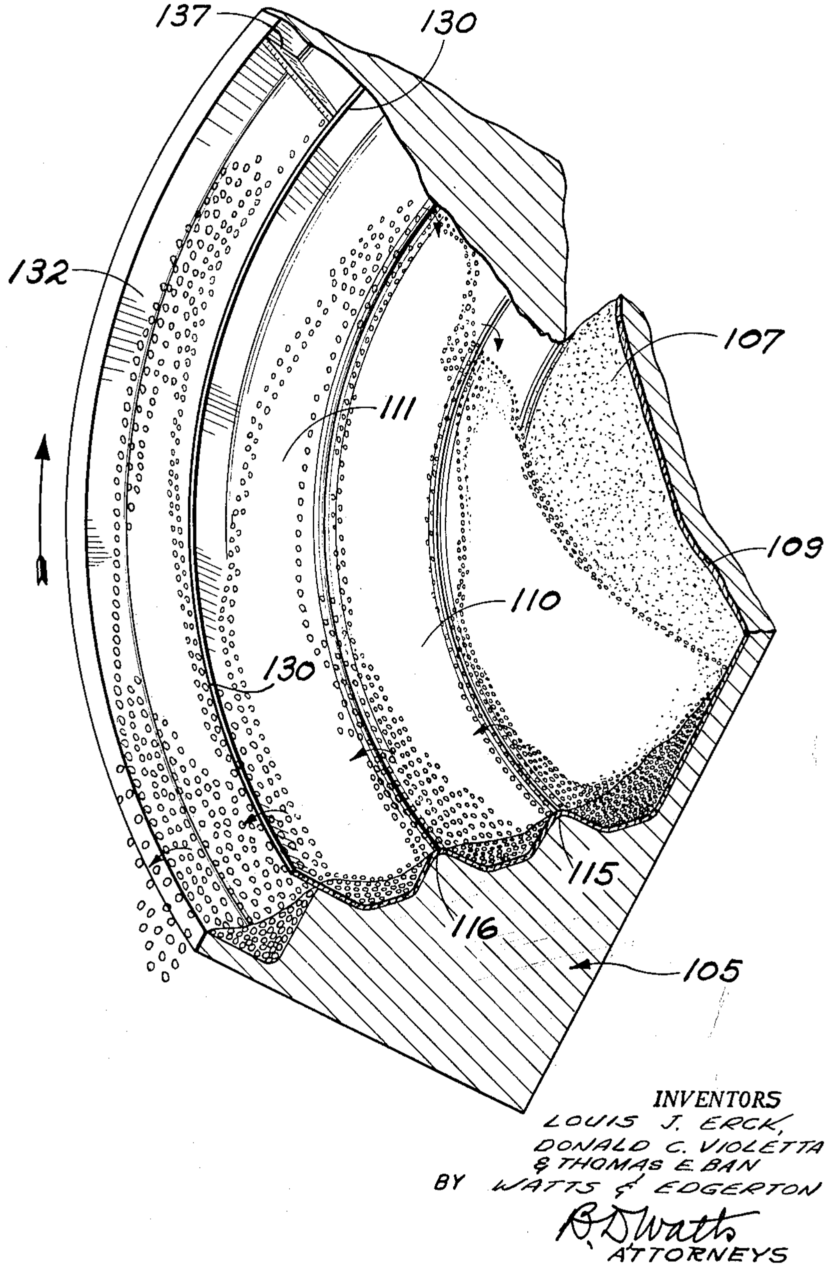
FIGURE 11 is a fragmentary, isometric view of the balling disc of FIGURE 7, illustrating the flow patterns of the materials in the disc during the balling operation.

In accordance with our theory, it may first be assumed, for purposes of illustration, that instead of a mixture of moist finely-divided ore and green ball nuclei and green balls of various sizes and of equal specific gravity, the vessel of FIGURE 11 is loaded with marbles graduated as to size with the smallest being located in the innermost portion of vessel 105 and the largest in the reroll zone 132. As vessel 105 is rotated on its axis in a clockwise direction at a constant rate of about 15 revolutions per minutes, the marbles in the separate zones are carried upwardly to roll back under gravitational force and are carried up again in a cascading action. This is a stable system in which there is essentially no migration of marbles between the separate zones and as long as there is no break-down of the marbles due to the rolling action, there will be no change in the disposition of the system. However, if it is assumed that marbles of the small size or the more finely-divided materials are charged into zone 107, there will be displacement of the larger bodies from zone 107 and as this charging continues, displacement of larger bodies from each of the outer zones begins and continues. A certain amount of the finer material in each instance is displaced from the inner zones. However, a counterflow of undersize material takes place as this material is carried upwardly by the centrifugal force imparted by vessel 105 until gravitational force draws the undersize material toward the inner zones of the vessel. If it is further assumed that feeding of the small size marbles or fine material is continued for a long period, it is seen that theoretically this will result in the eventual displacement of essentially all the original marble charge from zones 107, 110 and 111. Ultimately, flooding of reroll zone 132 by the finer material will, likewise, result in the elimination of substantially all the original marble charge from the vessel.

If, in addition to the above assumptions, it is assumed that accretion of the marbles of various sizes occurs in zones 107, 110, and 111, it will be understood that the result just described will not be obtained, providing such accretion takes place at a rate corresponding to the rate of charge of fine material into zone 107 and the rate of discharge of ball products from zones 111 and 132. This, of course, implies a net accretion rate where there is any tendency for degradation of the ball products in the vessel as it can be imagined that under certain conditions, ball formation and ball breakage could take place at the same rate with the result that no finished ball products would be obtained through the operation of the vessel. Balance between this net accretion rate and the in-feed or charge rate to the vessel will mean, among other things, that outward flow of undersize material into zones 110 and 111 will be greater in volume than the counterflow from these zones back toward zone 107, this undersize material being consumed in ball accretion in these outer zones. It will also mean that accretion of larger balls in zone 110 or 111 will be promoted, it being our observation that, surprisingly, the tendency is not for these undersize materials and fines to produce new small balls or nuclei but to promote growth of the larger ones.

This application is a division of our copending application Serial No. 580,423, filed February 15, 1956.

Having thus described the present invention so that others skilled in the art may be better able to understand and practice the same, we state that what we desire to secure by Letters Patent is defined in what is claimed.

What is claimed is:

1. A pelletizing apparatus adapted to form pellets of powdered material having its particles in an adhesive condition, the apparatus comprising a vessel having a substantially flat bottom and substantially circular confining wall members rising from the bottom portion, and having its inner surface shaped to form a plurality of annular coaxial trough-like portions of different diameter, the smaller being adjacent the flat bottom portion, said trough-like portions being separated by annular ridge portions, means for mounting the vessel to rotate on an axis at an acute angle to the horizontal, and means for feeding moistened powdered material to be pelletized to the vessel while rotating.

2. The apparatus described in claim 1 in whch the plurality of trough-like portions have a vertical depth at the lower segment when the vessel is in rotating position of substantially less than one-half of the axial height of the side wall of the vessel.

3. The combination of elements set forth in claim 1 in which each of the trough-like portions has a vertical depth at the lower segment when the vessel is in rotating position of substantially less than the axial length of said portion.

4. The combination of elements set forth in claim 1 in which each of the trough-like portions has an axial length of between about 6" and about 9½".

5. The combination of elements set forth in claim 1 in which at least the smaller of the trough-like portions has an axial length of between about 6" and about 9½".

6. The combination of elements set forth in claim 1 in which scraper means are spaced from the bottom surface of the disc to form a substantially uniform depth of the material moving with the disc surface.

7. The combination of elements set forth in claim 1 in which there is a filler in the corner like space between the base and side wall of at least the smaller trough-like portion.

8. The combination of elements set forth in claim 1 in which the outermost annular ridge portion has an axially extending barrier to prevent the return of balls from the outermost trough-like portion to other trough-like portions.

9. The combination of elements set forth in claim 1 in which at least the smaller trough-like portion has a depth as measured axially of the vessel of between about 6" and about 9½" and in which the acute angle is between about 20° and about 70° to the horizontal.

10. A pelletizing apparatus adapted to form pellets of powdered material comprising a vessel having a substantially flat bottom and a substantially circular confining wall rising from said bottom and defining at least two annular coaxial trough-like portions of different diameter, the smaller being adjacent to the flat bottom and having a depth measured axially of the vessel of between about 6" and about 9½", an annular ridge separating said trough-like portions, means for mounting the vessel to rotate on an axis disposed at an angle of between about 20° and about 70° to the horizontal and means for rotating the vessel.

11. A process of mixing and blending of finely divided solids and effecting the aggregation thereof into components of particles and pellets, comprising the steps of causing the material to cascade and roll upon itself in a thin sloping flat body of the material conforming at its under side substantially to a sloping plane, forming segments and portions of the material of varying depth and of different length in curving zones causing the formation of nuclei, continuing the motion of rolling the material upon itself in sloping plane formation while effecting cascading and forming pellets by accretion upon the nuclei and of individually increasing size, progressively moving the larger pellets so formed outwardly from the zone of the sloping plane of material from one curving path to another, gathering the nuclei and pellets into segmental concentric moving bodies of radially narrow dimension and of a depth limited to such dimension as to prevent sliding in a mass and continuing the rolling and falling action to move the formed larger pellets outwardly to another concentric moving narrow mass, while delivering larger formed pellets from the outer portion thereof and at the same time returning the smaller pellets and particles upwardly along the plane of the sloping thin revolving mass.

References Cited in the file of this patent

UNITED STATES PATENTS

| | | |
|---|---|---|
| 312,041 | Upjohn | Feb. 10, 1885 |
| 1,239,221 | Rodman | Sept. 4, 1917 |
| 1,537,348 | Grossmann | May 12, 1925 |
| 2,411,873 | Firth | Dec. 3, 1946 |
| 2,543,898 | De Vaney | May 6, 1951 |
| 2,709,833 | Wiklund | June 7, 1955 |
| 2,726,959 | Lushbough et al. | Dec. 13, 1955 |
| 2,818,601 | Argarwal | Jan. 7, 1958 |
| 2,834,043 | Haley et al. | May 13, 1958 |
| 2,860,598 | Loesche | Nov. 18, 1958 |

FOREIGN PATENTS

| | | |
|---|---|---|
| 502,233 | Canada | May 11, 1954 |
| 915,072 | Germany | July 16, 1954 |